US008456398B2

(12) United States Patent
Ito et al.

(10) Patent No.: US 8,456,398 B2
(45) Date of Patent: Jun. 4, 2013

(54) LIQUID CRYSTAL DISPLAY MODULE

(75) Inventors: Daisuke Ito, Tokyo (JP); Yoshitoshi Kida, Tokyo (JP); Takeya Takeuchi, Tokyo (JP); David Pusey, Basingstoke (GB); Peter Shadwell, Tadley (GB)

(73) Assignee: Sony Corporation, Tokyo (JP)

( * ) Notice: Subject to any disclaimer, the term of this patent is extended or adjusted under 35 U.S.C. 154(b) by 1080 days.

(21) Appl. No.: 12/418,319

(22) Filed: Apr. 3, 2009

(65) Prior Publication Data
US 2009/0251629 A1 Oct. 8, 2009

(30) Foreign Application Priority Data

Apr. 4, 2008 (GB) .................................. 0806193.9

(51) Int. Cl.
*G09G 3/36* (2006.01)

(52) U.S. Cl.
USPC .............................. 345/90; 345/204; 349/139

(58) Field of Classification Search
USPC ................ 345/87, 90, 204, 205, 206; 349/84, 349/139
See application file for complete search history.

(56) References Cited

U.S. PATENT DOCUMENTS

| 5,844,535 | A | 12/1998 | Itoh et al. |
| 6,097,361 | A * | 8/2000 | Rohner ............................ 345/87 |
| 6,469,684 | B1 | 10/2002 | Cole |
| 6,680,722 | B1 | 1/2004 | Hiraki et al. |
| 6,731,365 | B2 * | 5/2004 | Lin et al. ........................ 349/143 |
| 6,864,883 | B2 * | 3/2005 | Hector et al. ................. 345/204 |
| 7,319,448 | B2 * | 1/2008 | Kim et al. ........................ 345/87 |
| 2002/0044113 | A1 | 4/2002 | Ishiyama |

(Continued)

FOREIGN PATENT DOCUMENTS

| EP | 1 463 028 A2 | 9/2004 |
| KR | 10-2006-0007972 | 1/2006 |

(Continued)

OTHER PUBLICATIONS

British Office Action issued Dec. 16, 2011, in Patent Application No. GB0809584.6.

(Continued)

*Primary Examiner* — Tom Sheng
(74) *Attorney, Agent, or Firm* — Oblon, Spivak, McClelland, Maier & Neustadt, L.L.P.

(57) ABSTRACT

A liquid crystal display module including a liquid crystal display having a plurality of liquid crystal cells, a plurality of switches and a common connection, each liquid crystal cell being connected between a respective switch and a common connection. The common connection includes strips, each extending in a first direction and the strips being arranged side-by-side in a second direction. The liquid crystal cells are arranged in rows, each row being along and connected to a strip. The liquid crystal display has gate lines, each gate line operating a respective plurality of the switches. For dot inversion, each gate operates switches connected to respective liquid crystal cells of two adjacent rows. For each row, a first set of alternate liquid crystal cells are connected to respective switches operated by a respective gate line and a second set of interspersed liquid crystal cells are connected to respective switches operated by another respective gate line.

16 Claims, 18 Drawing Sheets

U.S. PATENT DOCUMENTS

| | | |
|---|---|---|
| 2002/0154084 A1 | 10/2002 | Tanaka et al. |
| 2002/0180899 A1 | 12/2002 | Lin et al. |
| 2003/0095091 A1 | 5/2003 | Enomoto et al. |
| 2005/0151065 A1 | 7/2005 | Min |
| 2005/0253829 A1* | 11/2005 | Mamba et al. ............... 345/204 |
| 2006/0145983 A1 | 7/2006 | Lee et al. |
| 2007/0152952 A1 | 7/2007 | Kang et al. |
| 2007/0166860 A1 | 7/2007 | Tanaka et al. |
| 2008/0068314 A1* | 3/2008 | Hsieh et al. .................... 345/87 |
| 2008/0068516 A1 | 3/2008 | Mori et al. |
| 2009/0251445 A1 | 10/2009 | Ito et al. |
| 2009/0284507 A1 | 11/2009 | Ito et al. |
| 2009/0295786 A1 | 12/2009 | Ito et al. |

FOREIGN PATENT DOCUMENTS

| | | |
|---|---|---|
| WO | WO 2007/072377 A2 | 6/2007 |
| WO | WO 2007/072377 A3 | 6/2007 |
| WO | WO 2008/155609 A1 | 12/2008 |

OTHER PUBLICATIONS

Communication pursuant to Article 94(3) EPC, issued May 23, 2011, in European Patent Application No. 09 250 779.7.

Office Action issued Oct. 6, 2011, in co-pending U.S. Appl. No. 12/418,301.

Extended European Search Report issued Jan. 28, 2011, in Patent Application No. 09250842.3.

* cited by examiner

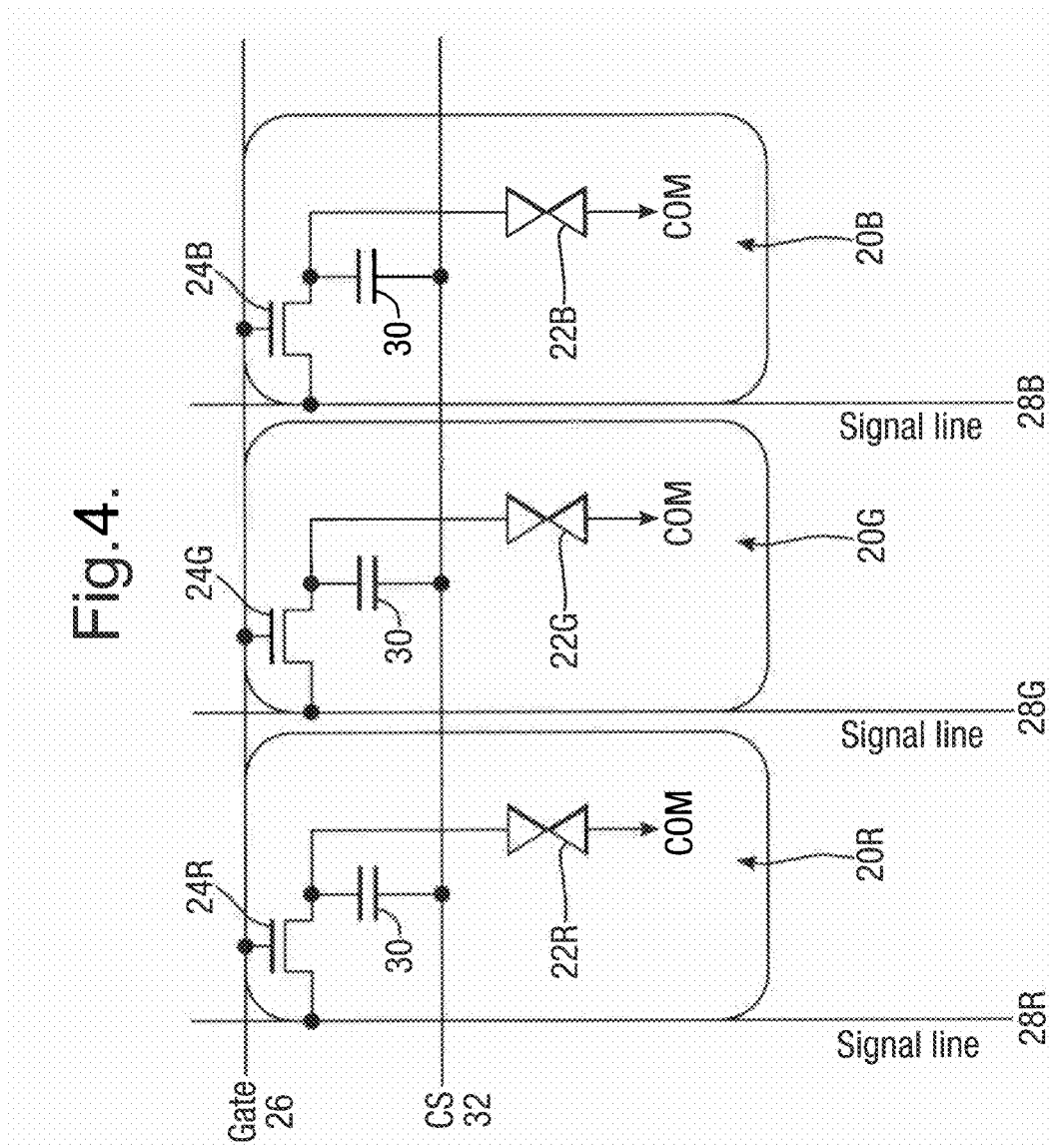

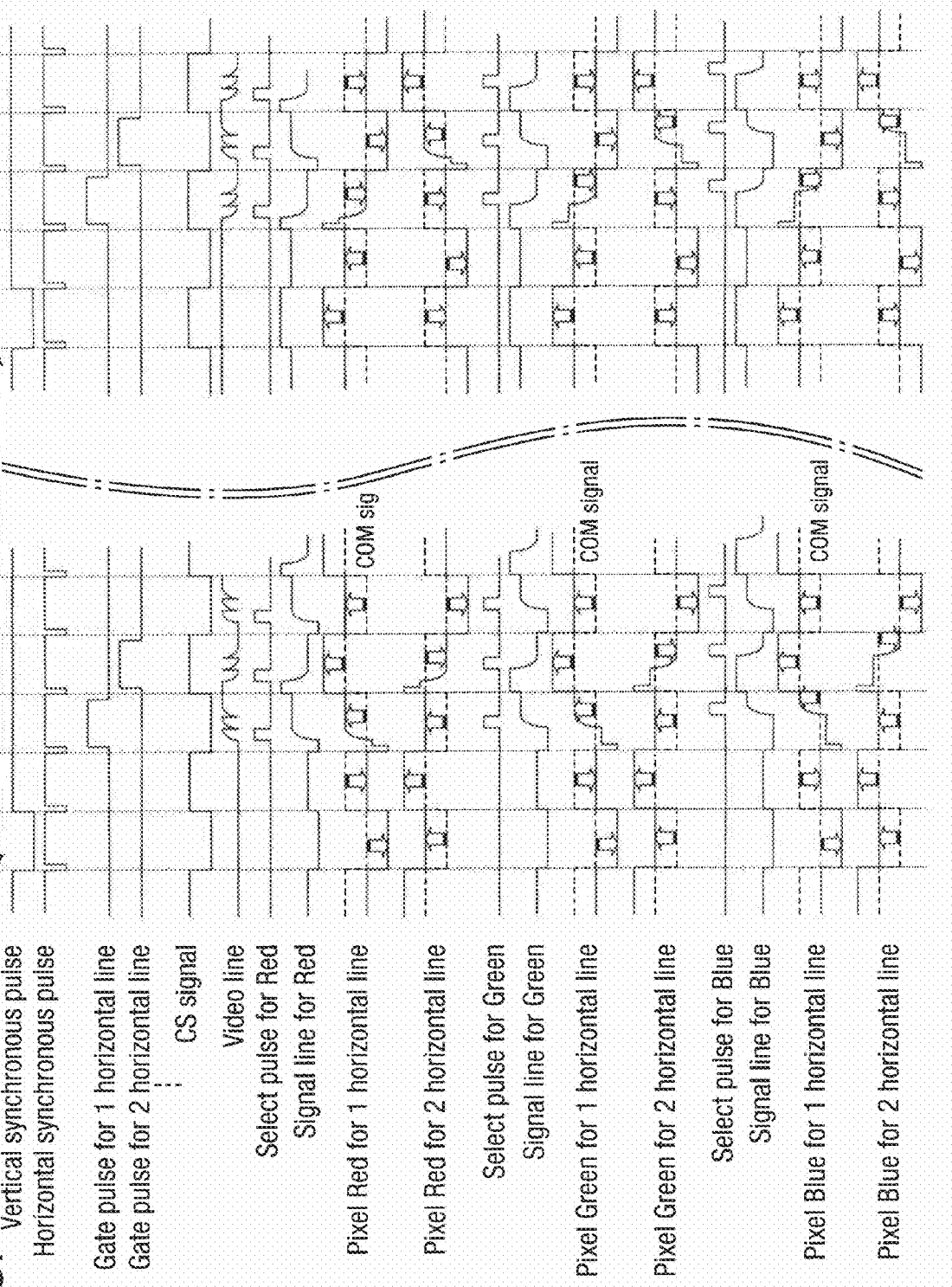

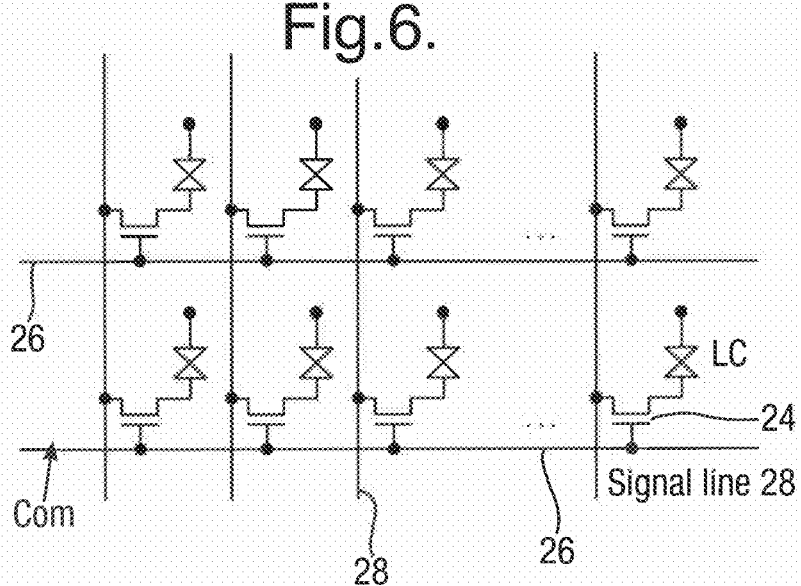

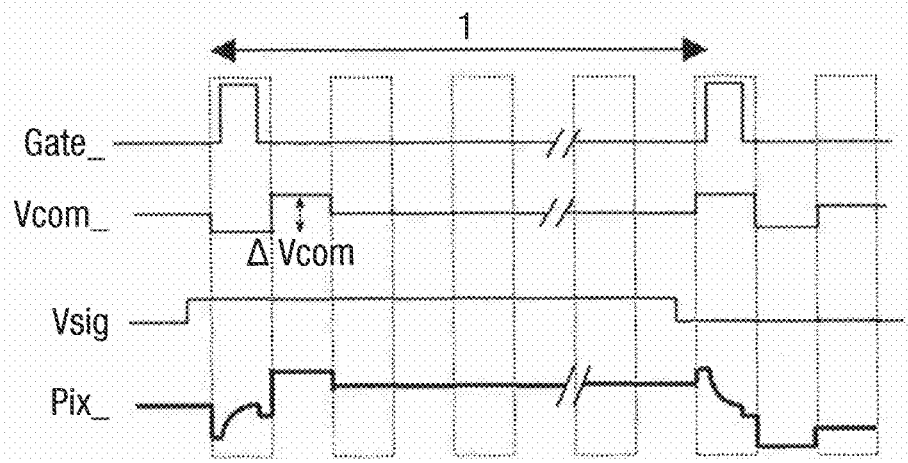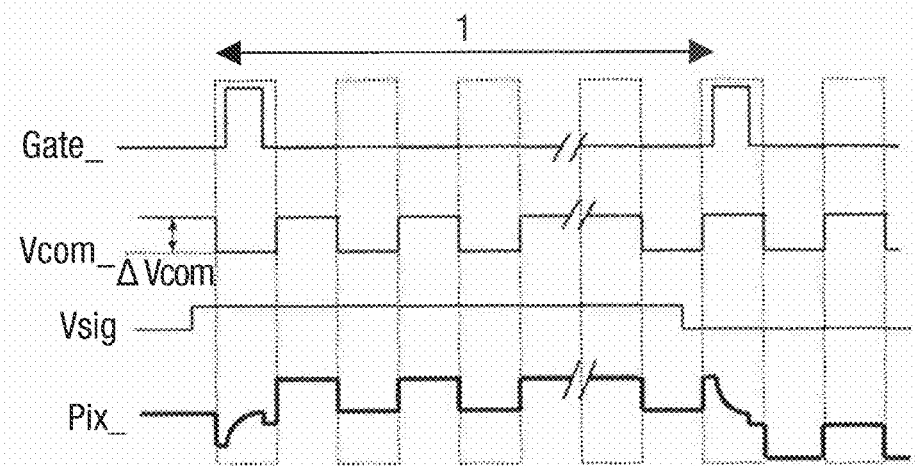

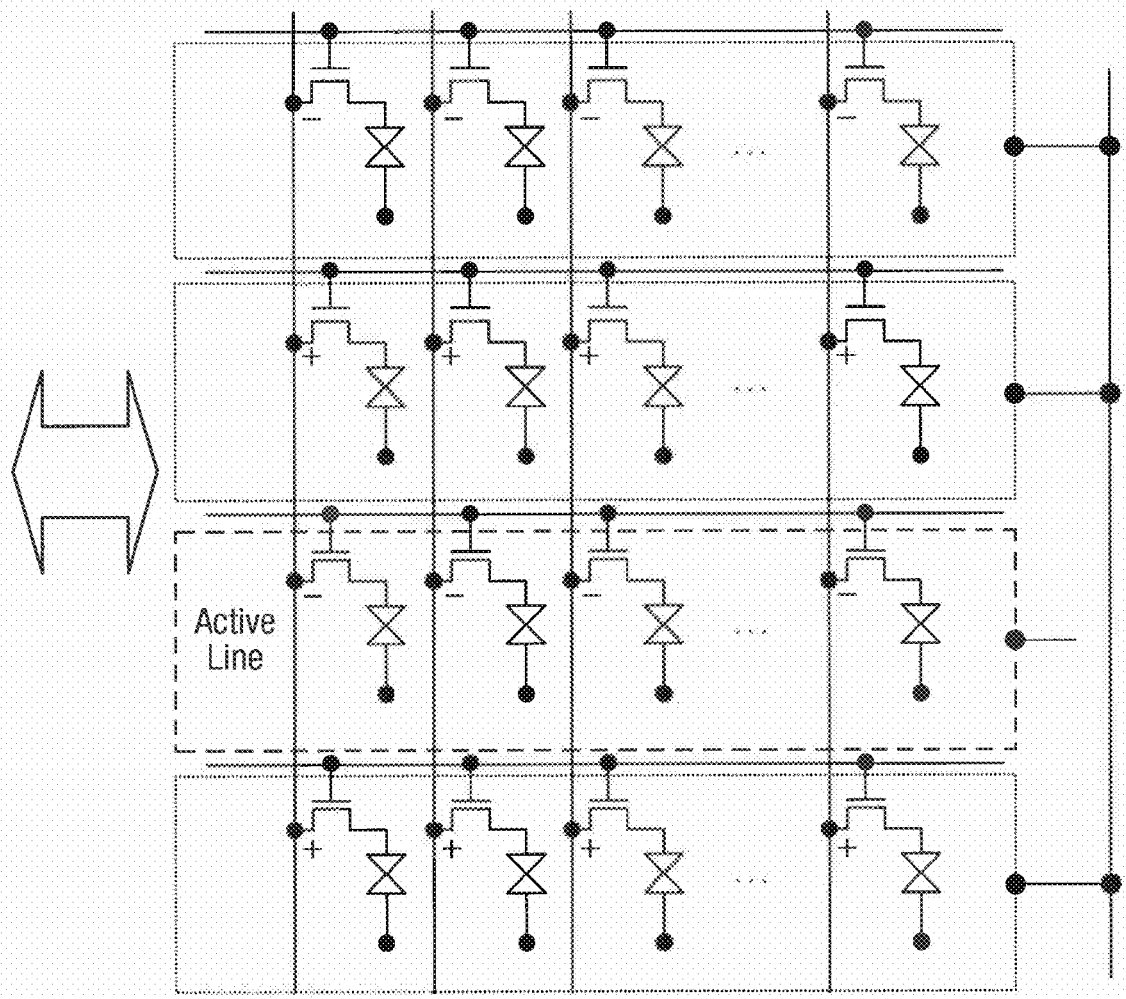

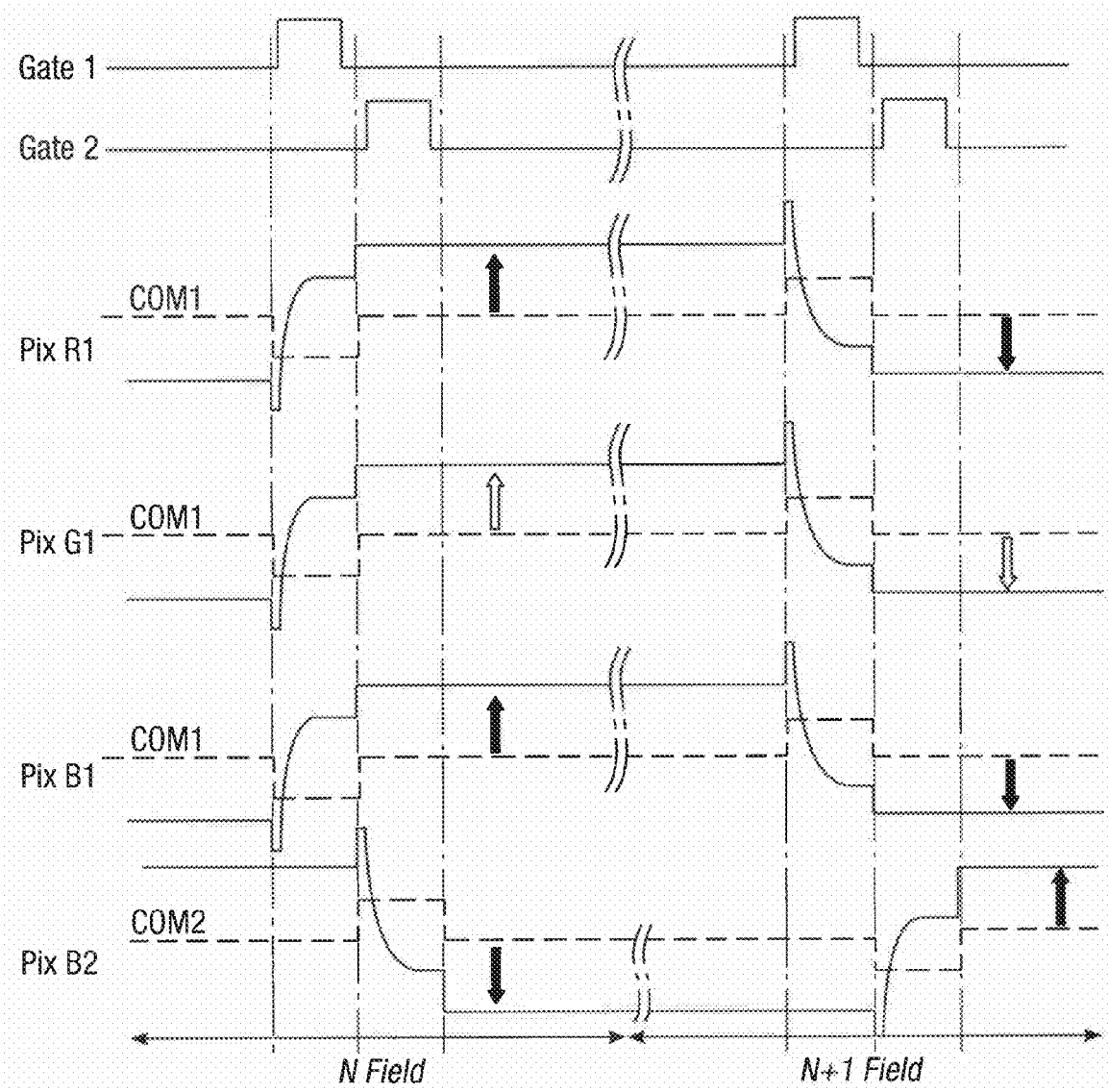

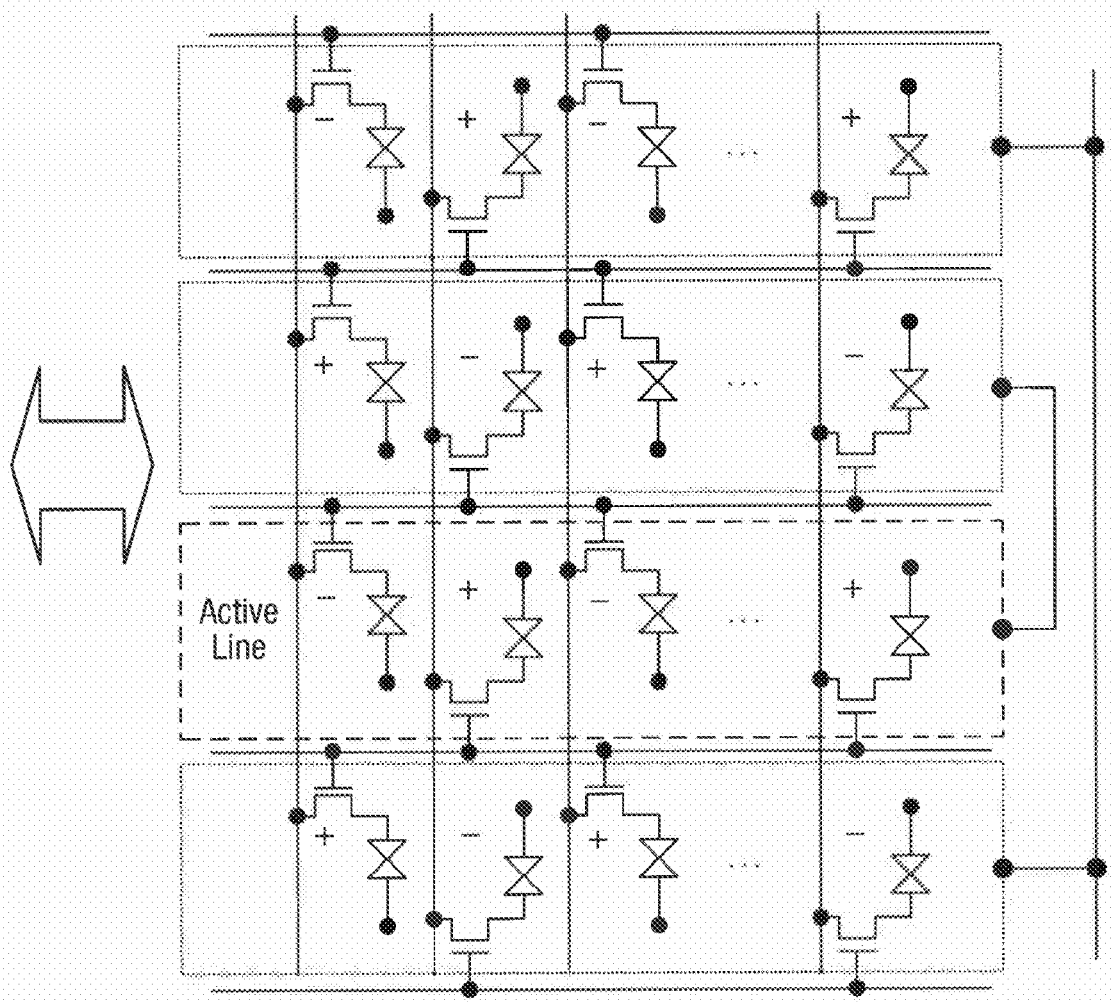

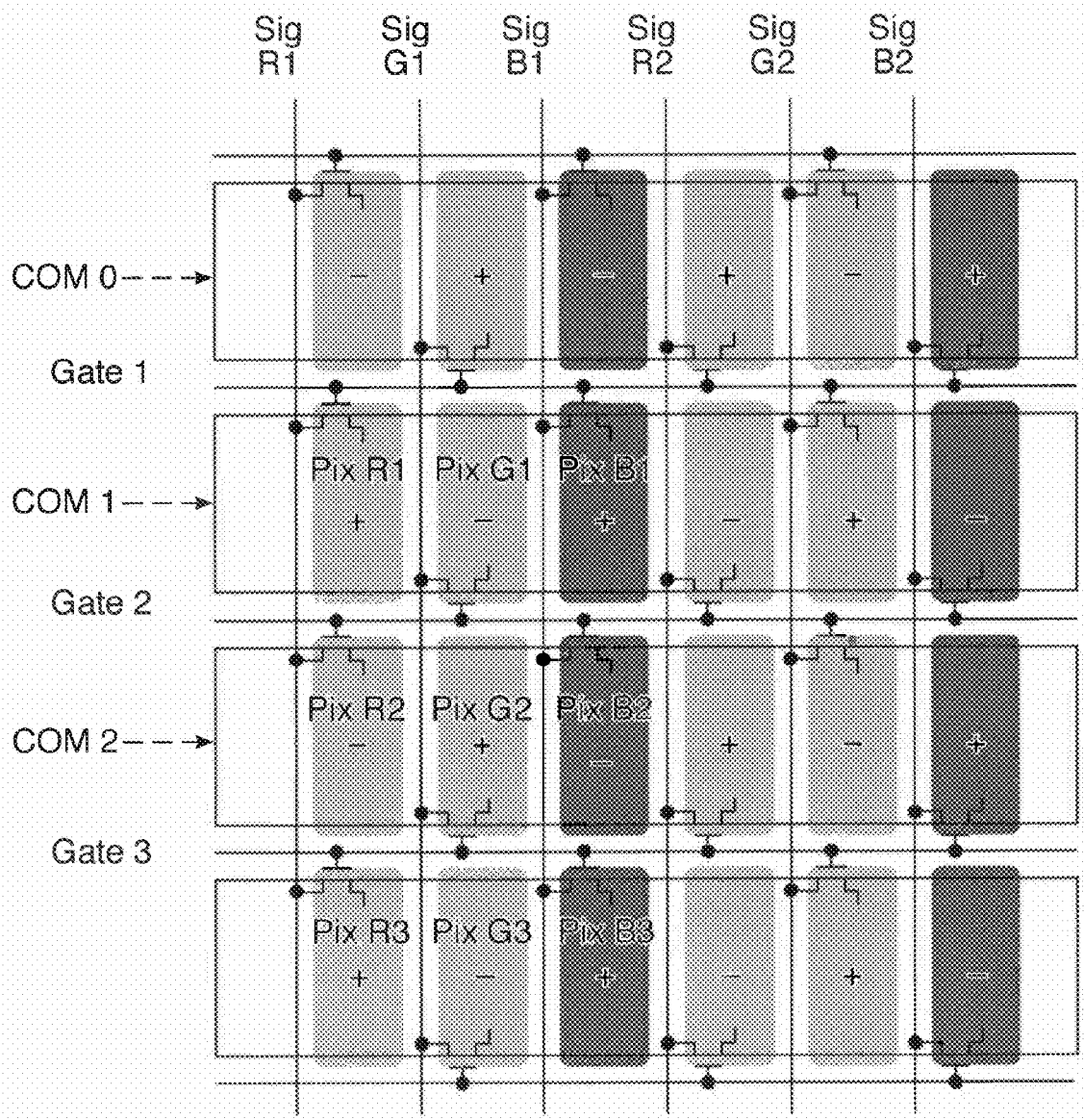

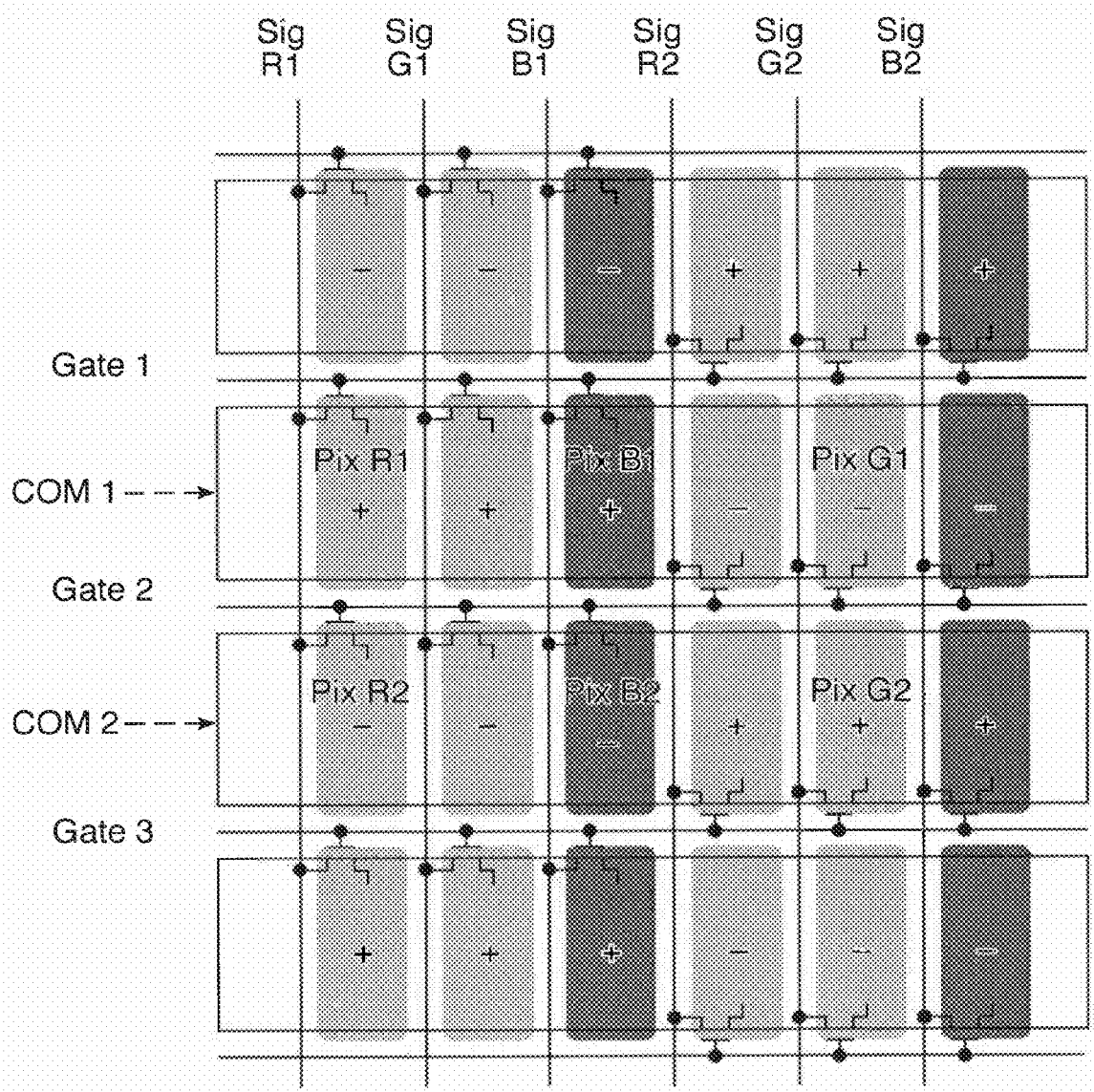

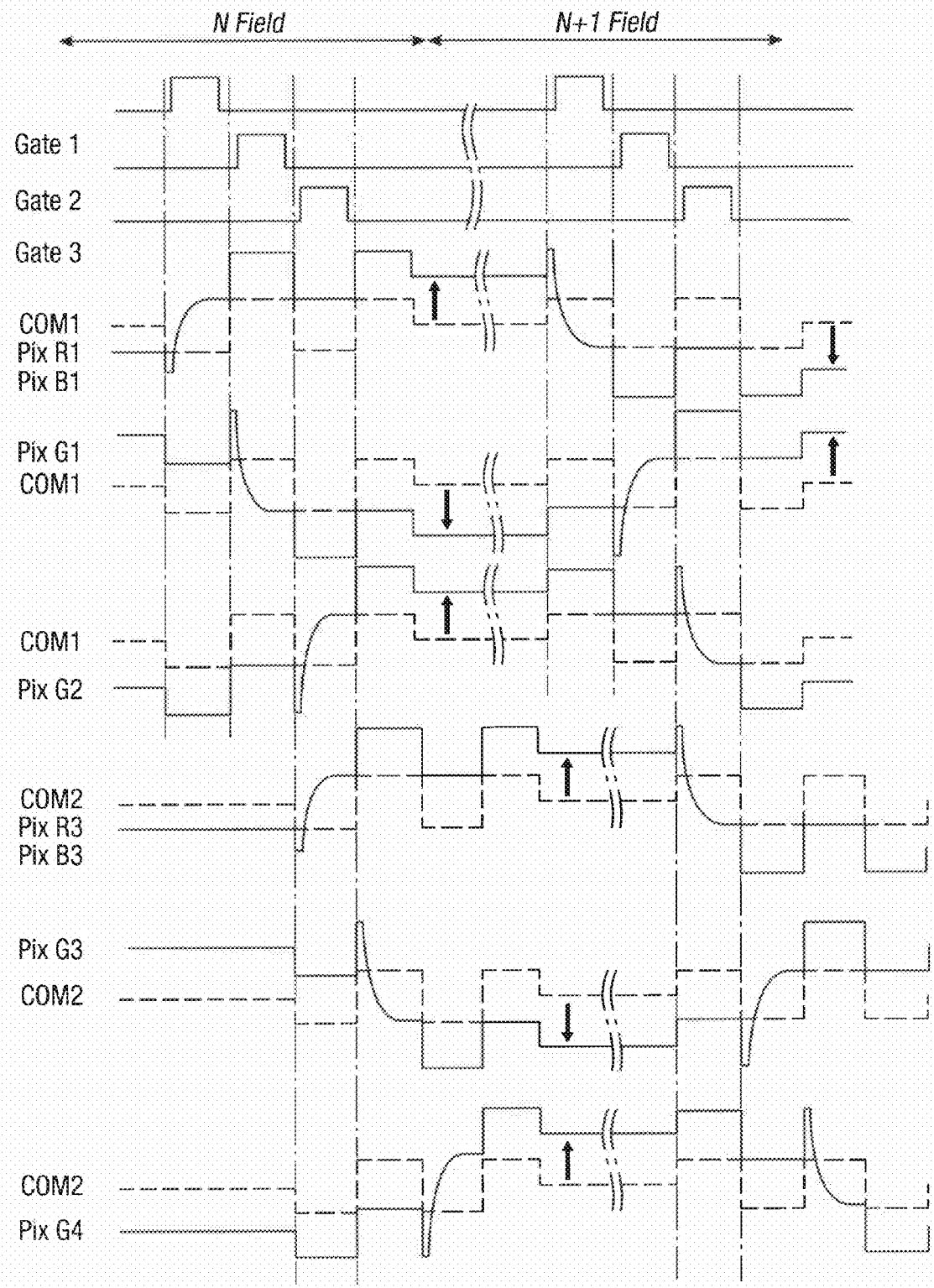

LIQUID CRYSTAL DISPLAY MODULE

BACKGROUND OF THE INVENTION

1. Field of the Invention

The present invention relates to a liquid crystal display module and a method of driving the liquid crystal display of such a module so as to reduce the overall power consumption.

2. Description of the Related Art

Liquid crystal displays are well known using a two-dimensional array of liquid crystal cells in which the cells share a plurality of signal lines in one direction and are selectively enabled by gate lines in a perpendicular direction. Drive circuits are provided which use the gate lines to enable respective sets of liquid crystal cells. The signal lines are then used to provide video signal levels to the enabled cells to charge those cells to the level required to give those cells their desired brightness.

It is usual to group the liquid crystal cells together to form image pixels. Each image pixel would typically include three liquid crystal cells corresponding respectively to red, green and blue. The red, green and blue liquid crystal cells of a pixel are provided on the same gate line and, indeed, can be driven by the same video signal. In particular, with a gate line enabling all of the liquid crystal cells of the pixel, the video signal is provided first to the red liquid crystal cell by means of its signal line, then to the green liquid crystal cell by means of its signal line and finally to the blue liquid crystal cell by means of its signal line.

The liquid crystal cells are normally all connected (on an opposite side to switches operated by the gate lines) to a common line which usually takes the form of a plate (COM plate) across the entire area of the liquid crystal display. The potential on the common line is varied in steps as a square wave so that the required inversion of sub-pixels or pixels occurs. Various forms of inversion are known: 1F frame inversion where all of the liquid crystal cells of a frame have the same potential for each frame, but the potential is changed from frame to frame; 1H inversion where all of the liquid crystal cells of a horizontal line have the same potential, but are inverted from line to line and frame to frame; and dot inversion where adjacent liquid crystal cells have opposite potential and are also inverted from frame to frame.

OBJECTS AND SUMMARY OF THE INVENTION

Irrespective of the inversion method, the present application recognises that alternating the potential on the COM plate consumes a relatively large amount of power due to the large capacitance of the COM plate. Also, the present application recognises that having all of the liquid crystal cells connected together on the same COM plate can result in noise in the displayed image.

According to the present invention, there is provided a method of driving a liquid crystal display having a plurality of liquid crystal cells, a plurality of switches and a common connection for the liquid crystal cells, each liquid crystal cell being connected between a respective one of the plurality of switches and the common connection. The method includes providing the common connection as a plurality of strips, each strip extending in a first direction and the plurality of strips being arranged side by side in a second direction wherein the plurality of liquid crystal cells are arranged in rows, each row being arranged along and connected to a strip. A plurality of gate lines are provided, each gate line operating a respective plurality of said switches wherein each gate line is configured to operate switches connected to respective liquid crystal cells of two adjacent rows. For each row, a first set of alternate liquid crystal cells are connected to respective switches operated by a respective one of said gate lines and connecting a second set of interspersed alternate liquid crystal cells to respective switches operated by a respective different one of said gate lines. The liquid crystal display is driven by controlling, in turn, each gate line to operate said switches connected to the liquid crystal cells of the respective two adjacent rows and simultaneously to drive to one of two predetermined potentials at least one of the strips corresponding to at least one of the respective two adjacent rows.

According to the present invention, there is also provided a liquid crystal display module including a liquid crystal display having a plurality of liquid crystal cells, a plurality of switches and a common connection for the liquid crystal cells, each liquid crystal cell being connected between a respective one of the plurality of switches and the common connection. The common connection includes a plurality of strips, each strip extending in a first direction and the plurality of strips being arranged side by side in a second direction. The plurality of liquid crystal cells are arranged in rows, each row being arranged along and connected to a strip. The liquid crystal display further has a plurality of gate lines, each gate line operating a respective plurality of said switches. Each gate line is configured to operate switches connected to respective liquid crystal cells of two adjacent rows. For each row, a first set of alternate liquid crystal cells are connected to respective switches operated by a respective one of said gate lines and a second set of interspersed alternate liquid crystal cells are connected to respective switches operated by a respective different one of said gate lines. The liquid crystal module further includes a driver circuit for driving the liquid crystal display, the driver circuit being configured to control, in turn, each gate line to operate said switches connected to the liquid crystal cells of the respective two adjacent rows and simultaneously to drive to one of two predetermined potentials at least one of the strips corresponding to at least one of the respective two adjacent rows.

In this way, for a dot inversion arrangement, it is possible to provide a plurality of COM strips in place of a single large COM plate such that the capacitance which is driven upon each inversion is reduced and, also, cross talk of image signal between rows of liquid crystal cells is also reduced.

According to the present invention, there is also provided a method of driving a liquid crystal display having a plurality of liquid crystal cells, a plurality of switches and a common connection for the liquid crystal cells, each liquid crystal cell being connected between a respective one of the plurality of switches and the common connection. The method includes providing the common connection as a plurality of strips, each strip extending in a first direction and the plurality of strips being arranged side by side in a second direction wherein the plurality of liquid crystal cells are arranged in rows, each row being arranged along and connected to a strip. A plurality of gate lines are provided, each gate line operating a respective plurality of said switches wherein each gate line is configured to operate switches connected to respective liquid crystal cells of a respective row. The method includes driving the liquid crystal display by controlling, in turn, each gate line to operate said switches connected to the liquid crystal cells of a respective row and simultaneously to drive the strip corresponding to the respective row to one of two predetermined potentials.

There is also provided a liquid crystal display module including a liquid crystal display having a plurality of liquid crystal cells, a plurality of switches and a common connection for the liquid crystal display cells, each liquid crystal cell being connected between a respective one of the plurality of switches and the common connection. The common connection includes a plurality of strips, each strip extending in a first direction and the plurality of strips being arranged side by side in a second direction. The plurality of liquid crystal cells are arranged in rows, each row being arranged along and connected to a respective strip. The liquid crystal display further has a plurality of gate lines, each gate line operating a respective plurality of said switches. Each gate line is configured to operate switches connected to respective liquid crystal cells of a respective row. The liquid crystal module further includes a driver circuit for driving the liquid crystal display, the driver circuit being configured to control, in turn, each gate line to operate said switches connected to the liquid crystal cells of a respective row and simultaneously to drive the strip corresponding to the respective row to one of two predetermined potentials.

In this way, similarly, for a horizontal 1H inversion method, it is possible to provide a series of COM strips rather than a large COM plate such that the capacitance that needs to be charged upon each inversion is reduced and cross talk from row to row is also reduced.

For the dot inversion arrangement, each row may be arranged along and connected to a respective strip. Hence, a strip is provided for each row of liquid crystal cells and the capacitance which needs to be driven for each row is reduced to the capacitance of one strip.

With this arrangement, it is possible to drive the two strips corresponding to the respective two adjacent rows to the one of two predetermined potential simultaneously.

In this way, alternate liquid crystal cells of one row are written simultaneously with alternate liquid crystal cells of an adjacent row.

When the strips are not driven with either a high or a low voltage (corresponding to the two predetermined voltages), they can be driven with a standby voltage preferably midway between the high and low voltages.

Preferably, the driver circuit is configured simultaneously to drive only the two strips to said one of two predetermined potentials at any one time.

As an alternative to the above, the rows may be arrange as adjacent pairs of rows where each pair of rows is arranged along and connected to a respective strip.

Thus, each strip is actually wide enough for two adjacent rows of liquid crystal cells. Because of the alternating arrangement of the liquid crystal cells with respect to the gate lines, each strip will have a central gate line operating alternate liquid crystal cells of two adjacent rows. It will also have gate lines on either side of that strip operating alternate liquid crystal cells of only one row of liquid crystal cells on that side of the strip.

With this arrangement, the capacitance which is required to be driven upon each inversion is still greatly reduced compared to a conventional plate and cross talk between adjacent pairs of rows will also be reduced.

Preferably, the driver circuit is configured to drive only the respective strip to said one of two predetermined potentials at any one time.

Similarly for the 1H inversion method, with one strip for each row of liquid crystal cells, the driver circuit is configured simultaneously to drive only the strip to said one of two predetermined potentials.

By not driving to said predetermined potential any strips other than those being written, the overall capacitance faced by the driving circuit during inversion is greatly reduced.

Preferably, the other strips are driven to a different predetermined potential. Preferably, this different predetermined potential is chosen so as to minimise the average potential change that the driving circuit is required to create on any strip at any one time. Hence, the predetermined potential will usually be at least approximately mid way between the two COM inversion potentials.

In this way, most of the display area (all but the one or two strips which are used for writing the sub-pixels active at the time) will have the same COM voltage, for instance the midway voltage. This provides advantages in being able to reduce leakage current compared to arrangements where alternate COM strips are charged to opposite inversion (predetermined) potentials and create electric fields therebetween.

BRIEF DESCRIPTION OF THE DRAWINGS

FIG. 4 illustrates schematically three pixel units of a pixel of a liquid crystal display;

FIG. 5 illustrates the timing of signals for driving the pixel units of FIG. 4;

FIG. 6 illustrates schematically a liquid crystal display suitable for 1H inversion;

FIGS. 7(a) and (b) illustrate respectively dot inversion and 1H inversion of a liquid crystal display;

FIGS. 8(a) and (b) illustrate respectively driving signals for dot inversion and 1H inversion;

DETAILED DESCRIPTION OF THE PREFERRED EMBODIMENTS

The invention will be more clearly understood from the following description, given by way of example only, with reference to the accompanying drawings.

Figure 1:
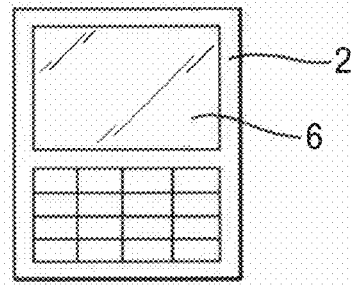
FIG. 1 illustrates a mobile telephone in which the present invention may be embodied.
Figure 2:
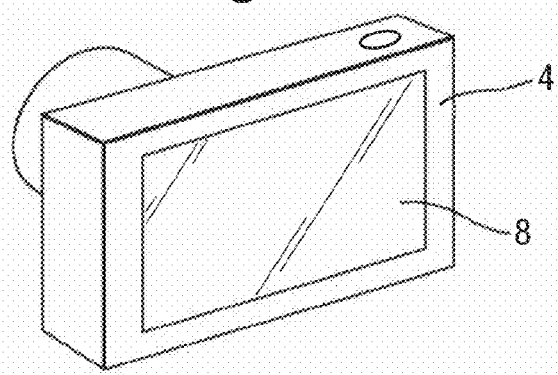
FIG. 2 illustrates a camera in which the present invention may be embodied.

The present invention is applicable to LCD (Liquid Crystal Display) modules such as are used in mobile telephone devices or digital cameras, for instance as illustrated respectively in FIGS. 1 and 2. The present invention could be applied to any LCD, including those with LCD driving circuits formed on the display panel of the LCD module itself.

In the mobile telephone device 2 of FIG. 1 and the digital camera 4 of FIG. 2, respective LCD modules 6 and 8 are provided for displaying images as required.

Figure 3:
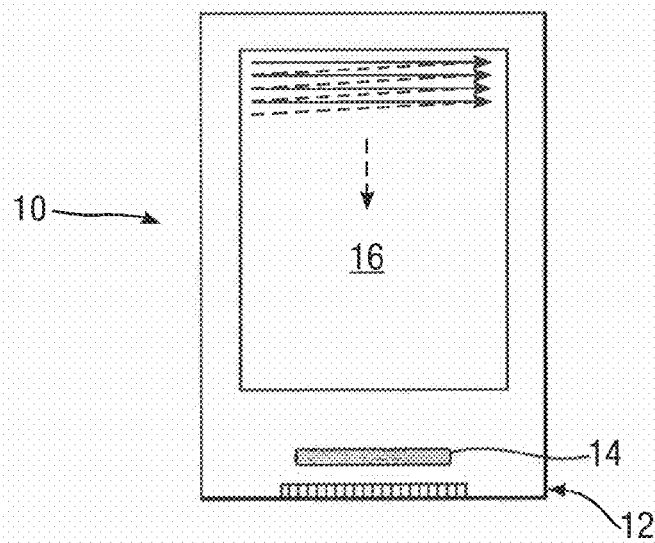
FIG. 3 illustrates a liquid crystal display module in which the present invention may be embodied.

FIG. 3 illustrates an LCD module 10 which is suitable for use in mobile telephone devices and digital cameras and which embodies the present invention.

The LCD module 10 includes at least one plate 12 made of glass (or any other suitable transparent material) against which a liquid crystal display 16 is formed in any known manner. In the illustrated embodiment, a driving circuit 14 is also formed on the glass plate 12. An LCD driving circuit 14 is illustrated at a lower portion of the display module 10. A similar driving circuit could be provided at any portion of the glass plate 12 around the display area 16 or, indeed, in a distributed manner around the display area 16.

FIG. 4 illustrates one example of how the display area 16 can be implemented.

The display area 16 is divided into a two-dimensional array of pixels. The pixels extend in horizontal rows in a first direction and in vertical columns in a second direction. By activating each pixel with a desired colour and brightness, an appropriate image can be displayed on the display 16.

In order to produce a variety of different colours, each pixel includes three pixel units 20R, 20G, 20B (otherwise known as sub-pixels) respectively for producing red, green and blue. FIG. 4 illustrates the three pixel units 20R, 20G, 20B of a pixel arranged side by side in the first (horizontal) direction. In this respect, it should be appreciated that the three pixel units 20R, 20G, 20B should be located close to one another in order to provide the desired visual combined colour, but the exact positioning of the pixel units is not critical.

Each of the pixel units 20R, 20G, 20B includes a corresponding liquid crystal cell 22R, 22G, 22B. One side of every liquid crystal cell 22R, 22G, 22B is connected to a common line COM which, in the preferred embodiment, is formed as part of the glass plate 12 itself. The opposite side of each liquid crystal cell 22R, 22G, 22B is connected to a respective control transistor or switch 24R, 24G, 24B.

As illustrated, all of the switches 24R, 24G, 24B in a row are controlled, in other words switched on or off, by means of a common gate line 26. A respective gate line is provided for each of the rows of the display 16. On the other hand, the inputs to the switches 24R, 24G, 24B are connected to signal lines 28R, 28G, 28B. In particular, all of the red pixel units 20R in the same column are connected to a single respective signal line 28R, all of the green pixel units 20G in the same column are connected to a single respective signal line 28G and all of the blue pixel units 20B in the same column are connected to a single respective signal line 28B.

In order to display an image on the display area 16 of the LCD module 10, an image is provided row by row. A particular gate line 26 is driven to a voltage so as to turn on all of the switches or transistors 24R, 24G, 24B in its respective row. While that gate line enables that particular row or horizontal line, first all of the red signal lines 28R are used to drive all of the red liquid crystal cells 22R in that row, then all of the green signal lines 28G are used to drive all of the green LCD cells 22G in that particular row and, finally, all of the blue signal lines 28B are used to drive all of the blue liquid crystal cells 22B in that particular row. Preferably, all of the pixel units 20R, 20G, 20B of a particular colour are driven simultaneously. However, other arrangements are also possible.

With one row or horizontal line written, the corresponding gate line 26 is driven to a voltage to turn off all of its corresponding switches or transistors 24R, 24G, 24B and another gate line is driven to a voltage to turn on its corresponding switches. Adjacent gate lines 26 can be driven one after the other, but other arrangements are possible. It will also be appreciated that different arrangements of arrays of pixel units can be provided to achieve the same effect.

In practice, the liquid crystal capacitance is somewhat variable and it becomes difficult, with only the arrangement described above, to drive reliably the liquid crystal cells 22R, 22G, 22B to the appropriate or desired brightness levels. To help compensate for the variability of the liquid crystal cells 22R, 22G, 22B, CS capacitors 30 are provided in parallel with the liquid crystal cells 22R, 22G, 22B. As illustrated, the CS capacitors 30 are provided between the signal driving end of the liquid crystal cells 22R, 22G, 22B and a CS line 32. For the arrangement described above, a CS line 32 is provided for each respective row or horizontal line. Thus, the CS capacitors 30 of all of the pixel units 20R, 20G, 20B of a respective row or horizontal line are connected to a corresponding respective CS line 32.

The CS line 32 is driven with a voltage corresponding closely to the voltage of the common voltage COM. In this way, variations in the capacitance of the liquid crystal cells 22R, 22G, 22B have less effect on driving of those liquid crystal cells 22R, 22G, 22B.

FIG. 5 illustrates various signals for driving the first two horizontal lines of the display 16. In this regard, it is worth noting that, for ongoing operation of the liquid crystal display 16, it is necessary to reverse the polarity applied to the liquid crystal cells 22R, 22G, 22B each time they are used; this is known as inversion. Hence, after each frame is displayed on the display 16, in other words after each vertical period, the polarity is reversed. Also, adjacent horizontal lines or rows are driven with opposite polarities.

As illustrated in FIG. 5, a vertical synchronous pulse having the length of one horizontal timing signifies a new frame. Also, a short horizontal synchronous pulse is provided to indicate each new horizontal line or row.

Gate pulses are shown for the first and second horizontal lines. Each gate pulse lies within the horizontal line period and, during a gate pulse, the respective row or horizontal line of pixel units 20R, 20G, 20B are enabled in the manner described above. Thus, during the gate pulse for the first horizontal line, all of the switches/transistors 24R, 24G, 24B of the first horizontal line are enabled, but none others. Similarly, for the second horizontal gate pulse, only the switches/transistors of the second row or horizontal line are enabled.

In FIG. 5, the voltages for a red pixel unit 20R, a green pixel unit 20G and a blue pixel unit 20B are indicated for first and second horizontal lines. The COM signal is illustrated as a dashed line overlying the voltage illustrated for the liquid crystal cells 22R, 22G, 22B of the pixel units 20R, 20G, 20B. As illustrated, from one horizontal line to the next, the COM signal changes from one voltage state to another. In this way, the polarity applied to adjacent horizontal rows of pixels is reversed. As also illustrated, for the second vertical period (on the right side of FIG. 5), the COM signal is reversed as a whole such that the pixels of a horizontal line are driven with opposite polarity from frame to frame.

The CS signal follows the COM signal with generally the same voltage.

The COM signal and CS signal change can state between zero volts and approximately 5 volts.

Within each horizontal period, respective select pulses are provided for the red pixel units 20R, green pixel units 20G and blue pixel units 20B. In this way, a common video line can be provided for one pixel, that video line including consecutively the driving signal required for the red pixel unit 20R, green pixel unit 20G and blue pixel unit 20B of the same pixel. The select pulses illustrated in FIG. 5 are used to apply appropriate portions of the video line signal to the respective red, green and blue pixel units 20R, 20G, 20B. As a result, during a particular respective select pulse, the signal line for the respective pixel unit 20R, 20G, 20B is driven to the required voltage provided by the common video line signal at that time.

FIG. 6 illustrates a two dimensional array of liquid crystal display cells having, as in FIG. 4, gate lines 26 and signal lines 28. As illustrated, each liquid crystal display cell 22 is connected between a common connection COM and a respective switch 24.

The individual liquid crystal display cells could be used to display different colours as described above or could be used as part of a monochrome display.

FIGS. 7(a) and 7(b) illustrate schematically two inversion methods for driving an array of liquid crystal display cells.

As considered above, it is necessary to invert the polarity used to drive the liquid crystal display cells each time those cells are refreshed.

In a dot inversion method such as illustrated in FIG. 7(a), individual cells are adjacent cells charged with opposite polarity and the polarity of all the cells is reversed from one field/frame to the next.

An alternative method is the "1H" inversion method illustrated in FIG. 7(b) where each one horizontal line of cells has the same polarity, but adjacent cells in the vertical direction have opposite polarity. The polarity of all cells are reversed from one field/frame to the next.

FIGS. 8(a) and 8(b) show typical signals for driving the dot inversion method and 1H inversion method respectively.

Previously, as discussed above, the common connection COM is provided as a single plate which extends across all of the liquid crystal display cells. All of the liquid crystal display cells are connected to COM, but merely move up and down with the potential of COM unless their respective switches connect them to a respective signal line. The potential of COM oscillates between two predetermined potentials so as to cause the required inversion on the liquid crystal display cells from dot to dot or line to line and also from field/frame to field/frame.

With this previous arrangement, unfortunately, COM has a relatively high capacitance resulting in a relatively high power consumption for the driver. In particular, the drawn current I=Ccom×Vcom×f(h) where Ccom is the capacitance of the COM plate, Vcom is the predetermined potential to which COM is driven and f(h) is the frequency of the change of the COM potential, for instance, the horizontal line frequency.

With the conventional arrangement, there is also a risk of image deterioration as a result of cross talk and flicker resulting from the capacitance.

The present invention follows a proposal to divide the conventional COM plate into an array of adjacent strips. This is illustrated schematically in FIGS. 9(a) and 9(b). As illustrated, the common connection COM is provided as an array of strips 30, rather than as a single plate.

Arranged along each strip 30 is a row of a plurality of liquid crystal cells 22. Each cell 22 is connected on one side to its corresponding COM strip 30 and, on the other side, to a respective switch 24. In the usual manner, the switches 24 may be MOSFETs. As illustrated, all of the gates of the switches 24 of a row of cells 22 are connected to a respective gate line 26. In this way, each gate line can be used to control simultaneously all of the cells 22 of its respective row. At the same time, the respective COM strip 30 can be driven to the required polarity suitable for writing to the cells 22 of that row/strip signals carried on the signal lines 28.

Figure 9A:
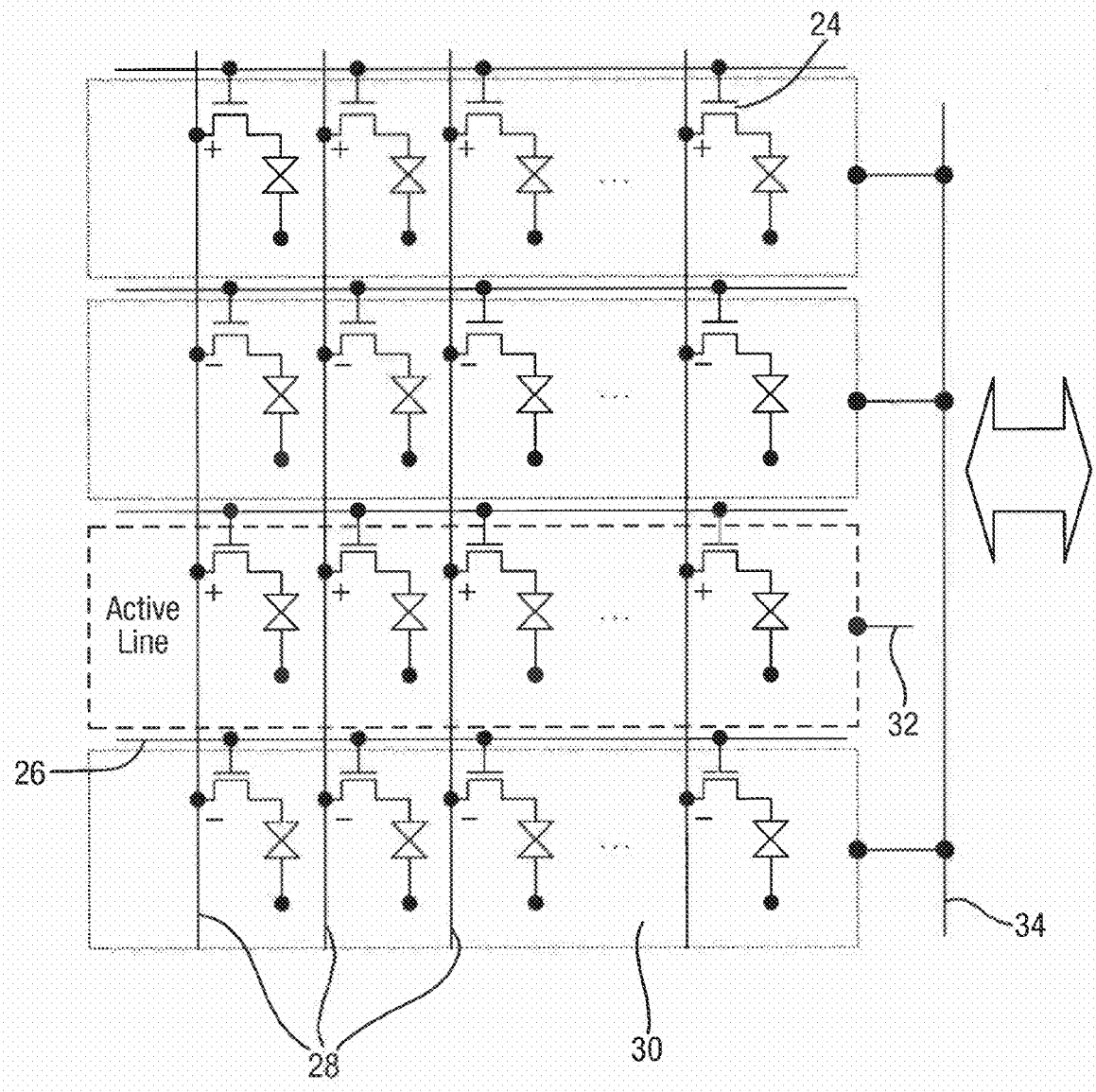
FIGS. 9(a) and (b) illustrate schematically two consecutive frames of a liquid crystal display with 1H inversion.

As illustrated schematically in FIGS. 9(a) and 9(b) a driving COM signal 32 is provided only to the COM strip 30 of the active line, namely the line made active by its respective gate line 26 enabling writing to the cells 22 of the respective row. All of the other COM strips 30 are provided with their standby COM signal 34. Preferably, when the driving COM signal 32 is provided as one of two potentials according to the inversion method, the stand-by COM signal 34 is provided as a potential substantially midway between the two potentials used for the driving COM signal 32. In this way, when a non-active line becomes an active line, the charge required to bring the corresponding COM strip 30 to the required potential will always be reduced.

Figure 10A:
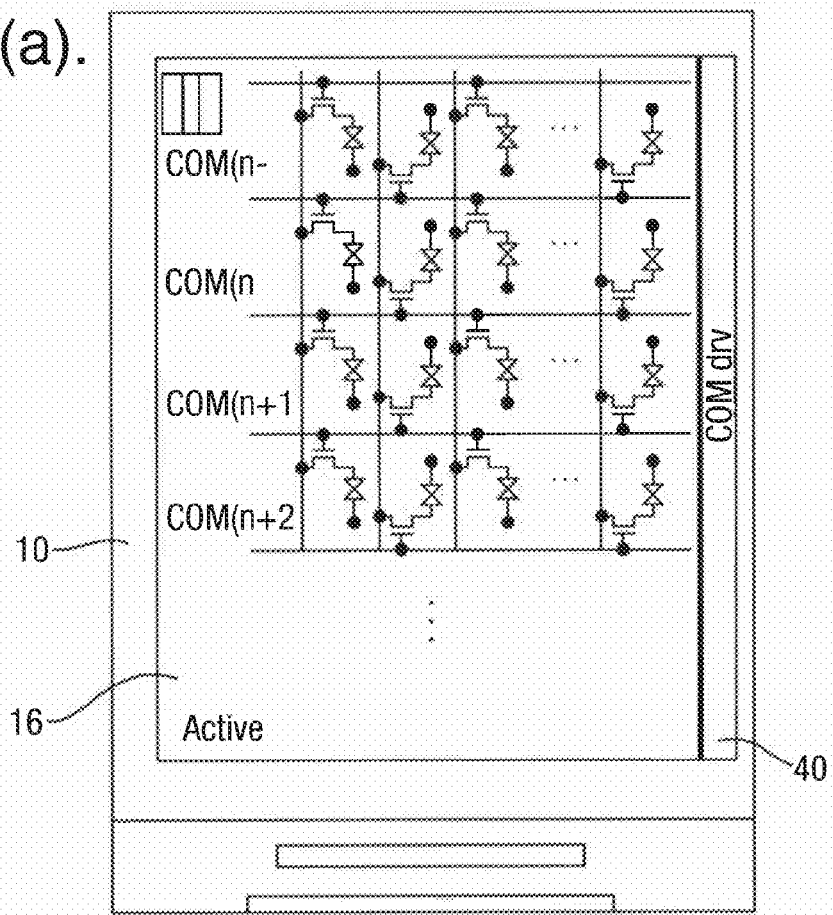
FIGS. 10(a) and (b) illustrate schematically a driver embodying the present invention.
Figure 10B:
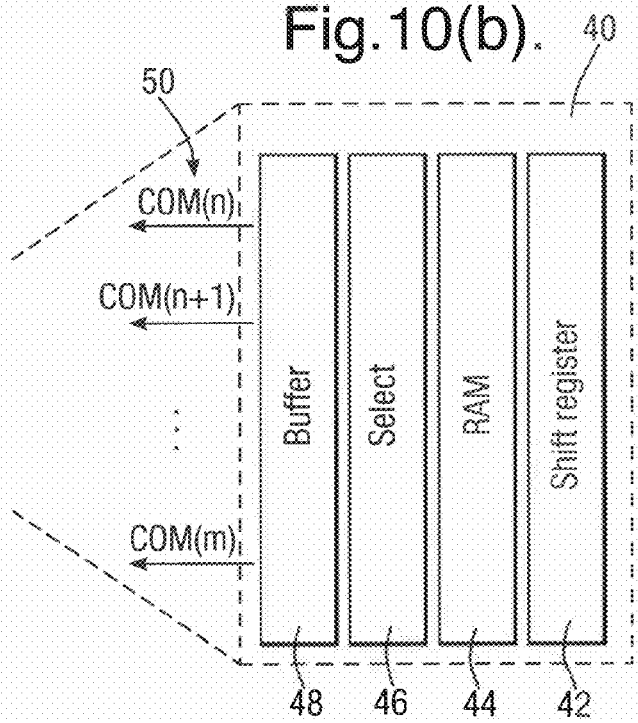

FIG. 10(a) illustrates schematically a liquid crystal display module 10 having a driver 40 provided alongside the display 16 itself. As illustrated in FIG. 10(b), the driver 40 includes a shift register 42, ram 44, select SW46 and buffer 48. The driver 40 has a plurality of drive lines 50 each respectively connected to one of the COM strips 30. The driver 40 is thus able to drive consecutively each COM strip 30 with the active driving COM signal 32 having the appropriate potential for the inversion method, whilst driving all other COM strips 30 with the non-active drive or stand-by COM signal 34.

Figure 9C:
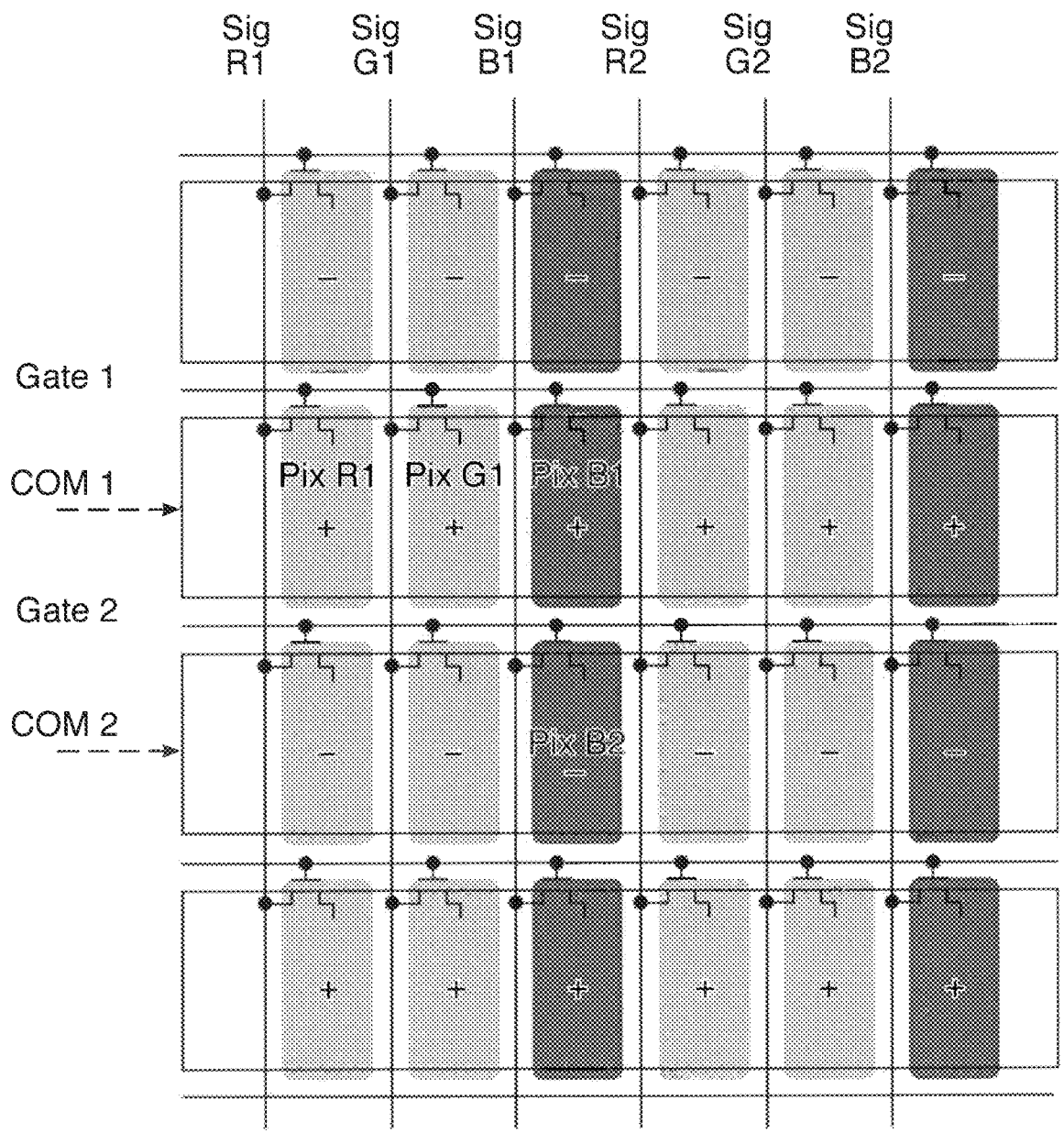
FIGS. 9(c) and (d) illustrate a 1H inversion method.

FIG. 9(c) illustrates schematically an arrangement for a colour display where pixels and sub-pixels are driven by a 1H inversion method in accordance with the embodiment described with reference to FIGS. 9(a) and (b).

As illustrated in FIG. 9(d), when Gate1 is provided with an active pulse, its corresponding COM strip COM1 is driven to an appropriate potential (a low potential $V_2$ as illustrated) such that all of the pixels and pixel units along that COM strip can be written. FIG. 9(d) illustrates writing to sub-pixels PixR1, G1 and B1.

After the active gate pulse for Gate1, it will be seen that the voltage for COM strip COM1 is returned to its standby signal, as illustrated a mid-voltage $V_1$. Also, it will be seen that during the gate pulse for Gate1, the voltage applied to the adjacent COM strip COM2 has applied to it the standby voltage, again a mid-voltage $V_1$ as illustrated.

For writing of the next line, Gate2 is provided with an active pulse and COM strip COM2 is made active. For this 1H inversion method, the COM strip COM2 is provided with a voltage opposite to that previously provided to COM strip COM1 (a high voltage $V_3$ as illustrated). All of the pixels and sub-pixels corresponding to Gate2 can then be written. In this respect, FIG. 9(d) illustrates writing only to sub-pixel PixB2.

As illustrated in FIG. 9(d), for the next field, the voltages applied to COM strips COM1 and COM2 are inverted. However, when the COM strips are not active, they are still provided with the standby signal, namely the mid-voltage $V_1$.

Figure 11A:
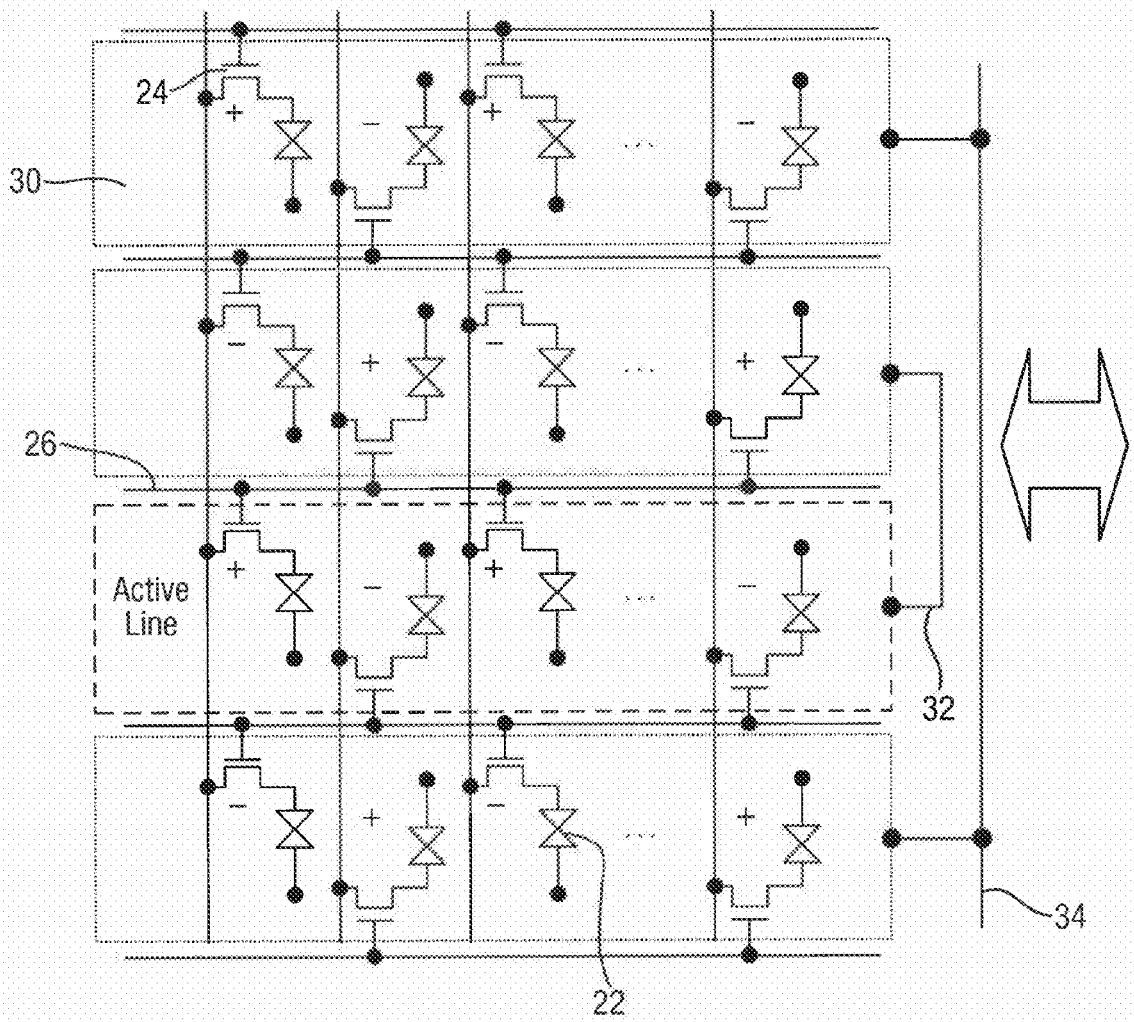
FIGS. 11(a) and (b) illustrate respectively two consecutive frames of dot inversion applied to a liquid crystal display.

FIGS. 11(a) and 11(b) illustrate driving two consecutive frames on a liquid crystal display again using COM strips 30, but arranged for dot inversion rather than 1H inversion.

As illustrated, in this arrangement, each gate line 26 is not connected to all of the gates of the switches 24 of a row of liquid crystal display cells 22. Instead, each gate line 26 is connected to alternate switches 24 of one row and alternate (interlaced) switches 24 of an adjacent row. Thus, when a gate line 26 is activated, alternate cells 22 of one row can be driven by their signal lines 28 at the same time as the interlaced alternate cells 22 of the adjacent row are driven with their signal lines 28. To do this, both of the adjacent COM strips 30 corresponding to the two adjacent rows of liquid crystal display cells 22 are driven with the driving COM signal 32 to the appropriate potential. It does not matter that other liquid crystal display cells 22 are also connected to the two adjacent COM strips 30 which are driven to an active state, because those other liquid crystal display cells 22 have their switches 24 turned off and, hence, are in a floating state.

As illustrated, both of such a pair of strips 30 are driven with the driving COM signal 32 simultaneously.

As with the 1H inversion arrangement discussed above, all other COM strips 30 are provided with a stand-by COM signal 34, for instance of an intermediate potential midway between the two active COM voltages.

A driver, such as driver 40 of FIG. 10(b) can be used with a liquid crystal display arranged in this way.

FIG. 12(a) illustrates schematically an arrangement for a colour display where individual pixel units or sub-pixels are driven in a dot inversion method. The individual pixel units or sub-pixels are connected to gate lines in an alternate manner in the same way as described for FIG. 11(a).

Figure 12B:
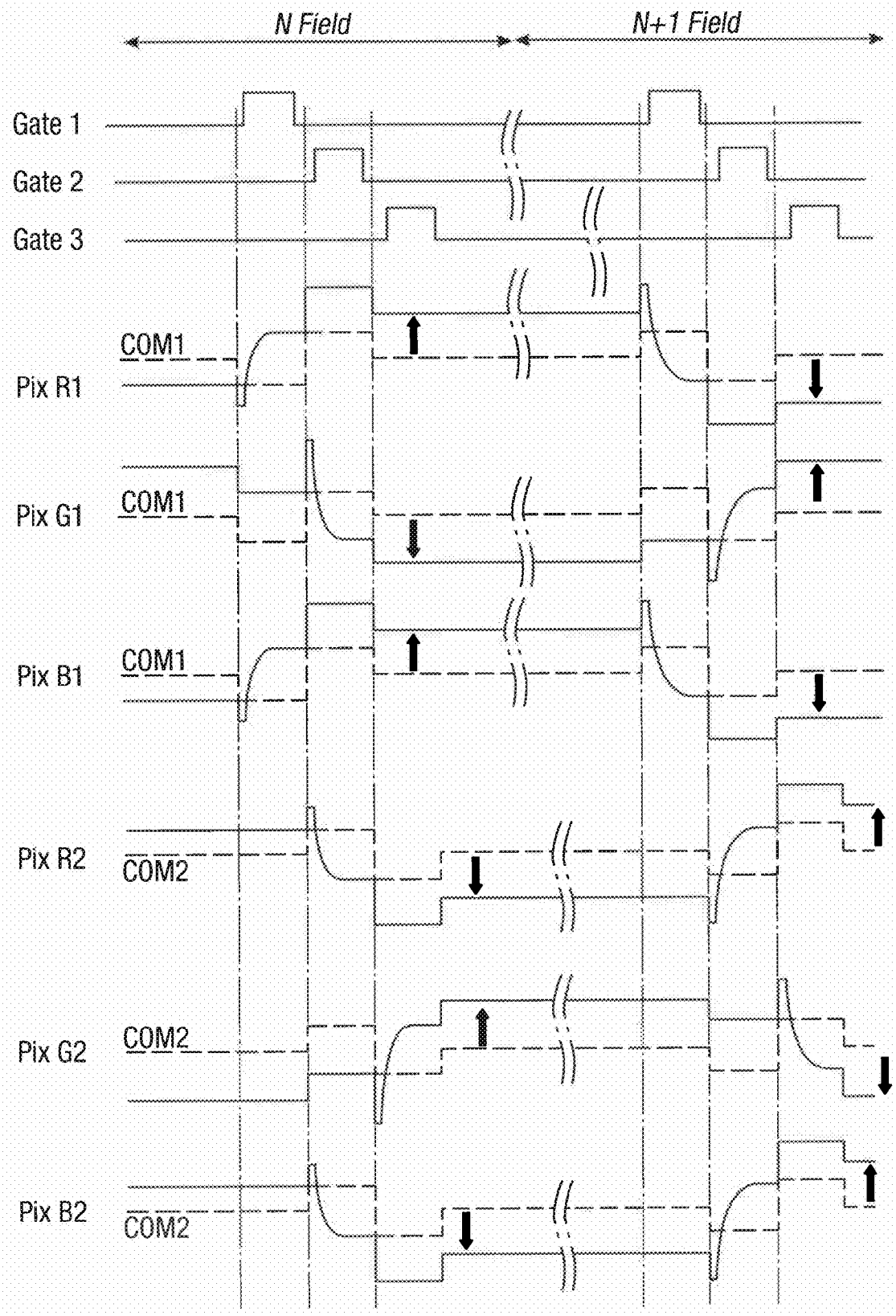
FIGS. 12(a) and (b) illustrate a dot inversion method for sub-pixels

As illustrated in FIG. 12(b), when Gate1 is provided with an active pulse, the sub-pixels PixR1 and B1 are switched on with COM strip COM1 driven with an appropriate potential, so that a signal can be written to those sub-pixels PixR1 and B1 as illustrated in FIG. 12(b). Although not illustrated, at the same time by driving COM0 with an appropriate potential, it is also possible to write a signal to the green sub-pixel above PixG1.

Subsequently when Gate2 is provided with an active pulse, sub-pixel PixG1, which is located between sub-pixels PixR1 and B1, is switched on. At this time, COM strip COM1 is driven with the opposite potential or inversion. Also, by driving COM strip COM2 with the same potential, the red and blue sub-pixels PixR2 and B2 can be written. Green sub-pixel PixG2 is written subsequently with Gate3.

As illustrated in FIG. 12(b), for the next field or frame, the COM potentials and signal potentials are reversed.

As described above and illustrated in FIG. 12(b), when COM strips are not driven with a low or high voltage for writing of their corresponding sub-pixels, they are driven with a standby signal, preferably a voltage midway between the low and high voltages.

FIG. 13(a) illustrates an arrangement for colour display where the dot inversion method is applied pixel by pixel, with all three sub-pixels of a pixel having the same polarity. Thus, as illustrated, each gate line is connected to the switches of alternate pixels (each having three sub-pixels) in a row of sub-pixels with respective liquid crystal display cells. The same gate line is connected to alternate pixels of an adjacent row of sub-pixels with liquid crystal display cells in an interlaced manner.

Figure 13B:
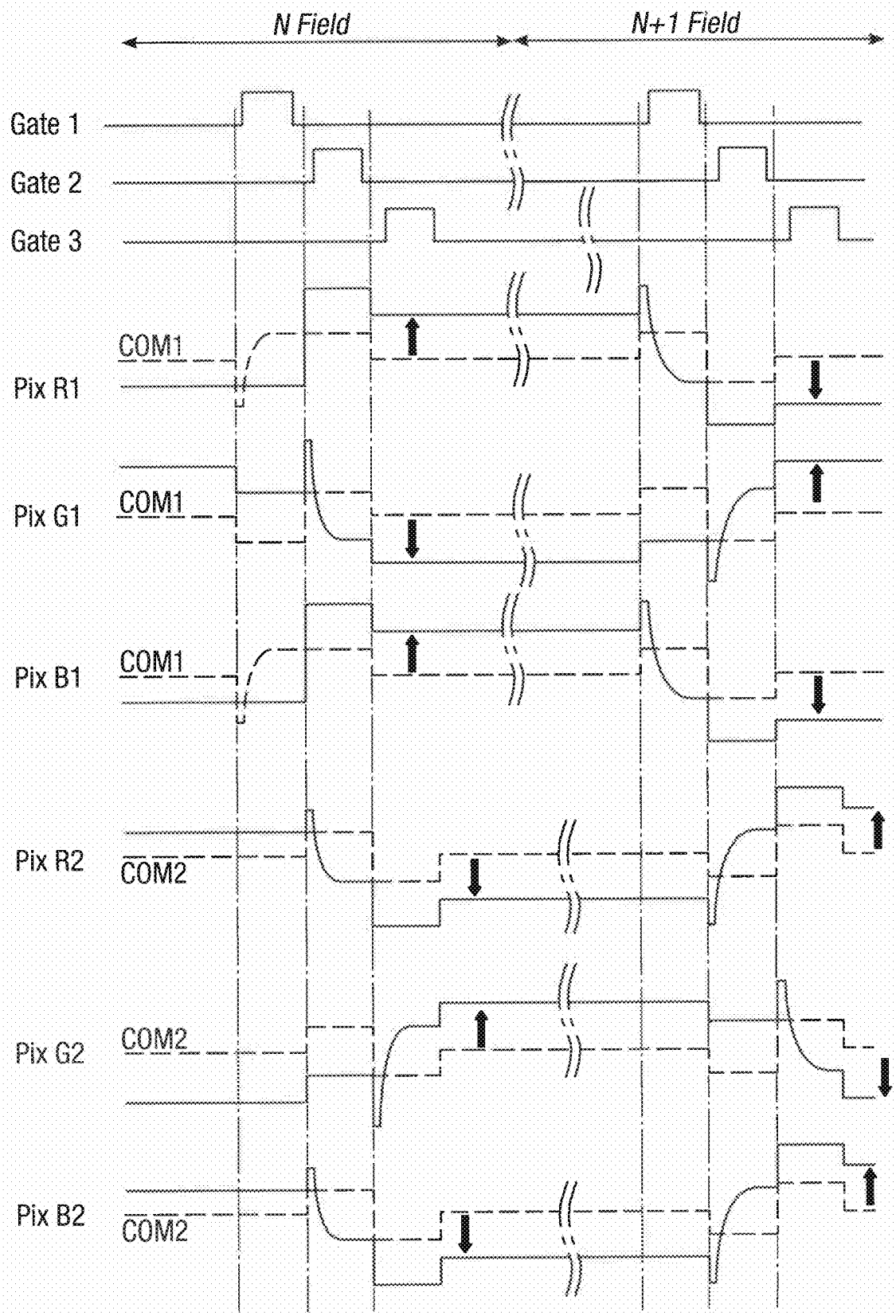
FIGS. 13(a) and (b) illustrate a dot inversion method for pixels.

This arrangement can be driven as illustrated in FIG. 13(b). When gate line Gate1 carries a pulse to turn on the switches to which it is connected and COM strip COM1 is driven to an appropriate potential sub-pixels PixR1 and B1 can be driven by their signal lines. Although not illustrated, the sub-pixel between PixR1 and B1 can be driven at the same time.

Subsequently, when gate line Gate2 carries the active pulse, the next pixel in the row becomes active. The COM strip COM1 is driven with the opposite polarity according to the dot inversion method and, as illustrated, sub-pixel PixG1 can be driven with its signal line. Although not illustrated, the sub-pixels either side of PixG1 can be driven at the same time.

Figure 14A:
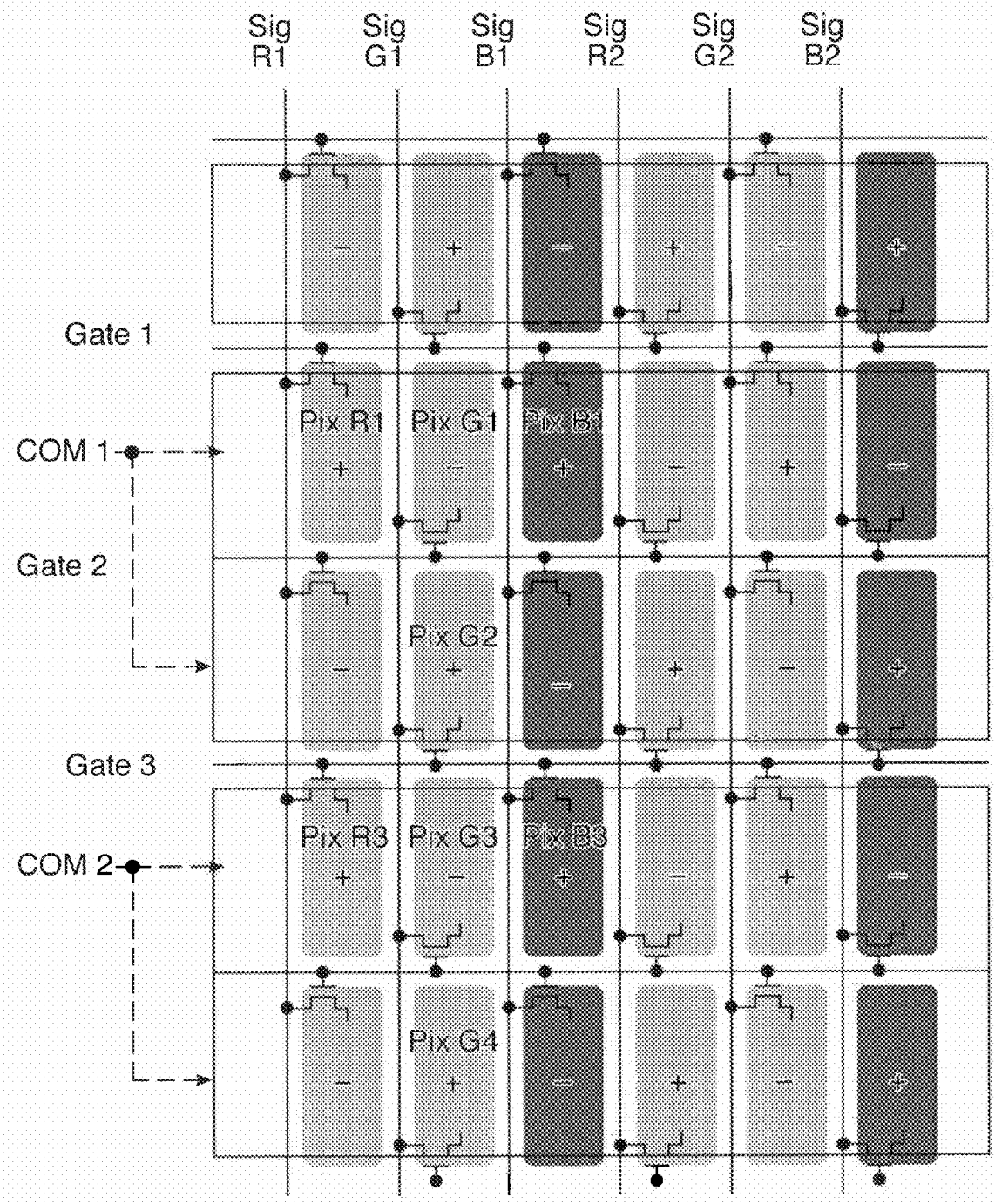
FIGS. 14(a) and (b) illustrate a dot inversion method for sub-pixels using COM strips provided for pairs of adjacent rows of liquid crystal cells.

FIG. 14(a) illustrates schematically a liquid crystal display having a sub-pixel and gate arrangement similar to that of FIG. 12(a). However, with the arrangement of FIG. 14(a), adjacent pairs of COM strips are connected together. Indeed, rather than providing an individual COM strip for each respective row of liquid crystal display cells, it is possible to provide half as many COM strips, each having twice the width such that each COM strip connects to two adjacent rows of liquid crystal display cells.

FIG. 14(b) illustrates schematically how such an arrangement can be driven.

When gate line Gate1 carries an active pulse, sub-pixels PixR1 and B1 will be turned on and with the large COM strip COM1 at an appropriate potential, the sub-pixels PixR1 and B1 can be driven with their signal lines.

In the next cycle, the potential of large COM strip COM1 is inverted and gate line Gate2 carries an active pulse. At this time, the switch for sub-pixel PixG1 is turned on and it becomes possible to drive that sub-pixel with its signal line. At the same time, the red and blue sub-pixels below PixR1 and B1 can be written.

In the next cycle, large COM strip COM1 is again inverted and gate line Gate3 becomes active such that the switch for sub-pixel PixG2 is turned on and it becomes possible to drive that sub-pixel with its signal line. The large COM strip COM2 could also be activated so that sub-pixels PixR3 and B3 can be written. With subsequent inversions of COM strip COM2, sub-pixels PixG3 and then PixG4 can be written.

When not being used for writing sub-pixels, other strips are all driven with the standby signal potential, preferably midway between the two active voltages for COM.

We claim:

1. A liquid crystal display module including:
   a liquid crystal display having a plurality of liquid crystal cells, a plurality of switches and a common connection for the liquid crystal cells, each liquid crystal cell being connected between a respective one of the plurality of switches and the common connection;
   wherein the common connection includes a plurality of strips, each strip extending in a first direction and the plurality of strips being arranged side by side in a second direction;
   wherein the plurality of liquid crystal cells are arranged in rows, each row being arranged along and connected to a respective strip;
   wherein the liquid crystal display further has a plurality of gate lines, each gate line operating a respective plurality of said switches;
   wherein each gate line is configured to operate switches connected to respective liquid crystal cells of two adjacent rows;
   wherein, for each row, a first set of alternate liquid crystal cells are connected to respective switches operated by a respective one of said gate lines and a second set of interspersed alternate liquid crystal cells are connected to respective switches operated by a respective different one of said gate lines; and
   wherein the liquid crystal module further includes a driver circuit for driving the liquid crystal display, the driver circuit being configured to control, in turn, each gate line to operate said switches connected to the liquid crystal cells of the respective two adjacent rows and simultaneously to drive to one of two predetermined potential two strips corresponding to two adjacent rows.

2. A liquid crystal module according to claim 1 wherein the driver circuit
   is configured simultaneously to drive only the two strips to said one of two predetermined potentials at any one time.

3. A liquid crystal module according to claim 1 wherein the other strips are not driven to said one of two predetermined potentials.

4. A liquid crystal module according to claim 3 wherein the other strips are driven to a different predetermined potential.

5. A liquid crystal module according to claim 4 wherein the other strips are driven to a potential substantially midway between said two predetermined potentials.

6. A mobile telephone including a liquid crystal display module including:
   a liquid crystal display having a plurality of liquid crystal cells, a plurality of switches and a common connection for the liquid crystal cells, each liquid crystal cell being connected between a respective one of the plurality of switches and the common connection;

wherein the common connection includes a plurality of strips, each strip extending in a first direction and the plurality of strips being arranged side by side in a second direction;

wherein the plurality of liquid crystal cells are arranged in rows, each row being arranged along and connected to a respective strip;

wherein the liquid crystal display further has a plurality of gate lines, each gate line operating a respective plurality of said switches;

wherein each gate line is configured to operate switches connected to respective liquid crystal cells of two adjacent rows;

wherein, for each row, a first set of alternate liquid crystal cells are connected to respective switches operated by a respective one of said gate lines and a second set of interspersed alternate liquid crystal cells are connected to respective switches operated by a respective different one of said gate lines; and wherein the liquid crystal module further includes a driver circuit for driving the liquid crystal display, the driver circuit being configured to control, in turn, each gate line to operate said switches connected to the liquid crystal cells of the respective two adjacent rows and simultaneously to drive to one of two predetermined potential two strips corresponding to two adjacent rows.

7. A camera including a liquid crystal display module including:

a liquid crystal display having plurality of liquid crystal cells, a plurality of switches and a common connection for the liquid crystal cells, each liquid crystal cell being connected between a respective one of the plurality of switches and the common connection;

wherein the common connection includes a plurality of strips, each strip extending in a first direction and the plurality of strips being arranged side by side in a second direction;

wherein the plurality of liquid crystal cells are arranged in rows, each row being arranged along and connected to a respective strip;

wherein the liquid crystal display further has a plurality of gate lines, each gate line operating a respective plurality of said switches;

wherein each gate line is configured to operate switches connected to respective liquid crystal cells of two adjacent rows;

wherein, for each row, a first set of alternate liquid crystal cells are connected to respective switches operated by a respective one of said gate lines and a second set of interspersed alternate liquid crystal cells are connected to respective switches operated by a respective different one of said gate lines; and wherein the liquid crystal module further includes a driver circuit for driving the liquid crystal display, the driver circuit being configured to control, in turn, each gate line to operate said switches connected to the liquid crystal cells of the respective two adjacent rows and simultaneously to drive to one of two predetermined potential two strips corresponding to two adjacent rows.

8. A method of driving a liquid crystal display having a plurality of liquid crystal cells, a plurality of switches and a common connection for the liquid crystal cells, each liquid crystal cell being connected between a respective one of the plurality of switches and the common connection, the method including:

providing the common connection as a plurality of strips, each strip extending in a first direction and the plurality of strips being arranged side by side in a second direction wherein the plurality of liquid crystal cells are arranged in rows, each row being arranged along and connected to a respective strip;

providing a plurality of gate lines, each gate line operating a respective plurality of said switches wherein each gate line is configured to operate switches connected to respective liquid crystal cells of two adjacent rows;

for each row, connecting a first set of alternate liquid crystal cells to respective switches operated by a respective one of said gate lines and connecting a second set of interspersed alternate liquid crystal cells to respective switches operated by a respective different one of said gate lines; and driving the liquid crystal display by controlling, in turn, each gate line to operate said switches connected to the liquid crystal cells of the respective two adjacent rows and simultaneously to drive to one of two predetermined potentials two strips corresponding to two adjacent rows.

9. A liquid crystal display module including:

a liquid crystal display having a plurality of liquid crystal cells, a plurality of switches and a common connection for the liquid crystal cells, each liquid crystal cell being connected between a respective one of the plurality of switches and the common connection;

wherein the common connection includes a plurality of strips, each strip extending in a first direction and the plurality of strips being arranged side by side in a second direction;

wherein the plurality of liquid crystal cells are arranged in rows, the rows being arranged as adjacent pairs of rows, each pair of rows being arranged along and connected to a respective strip;

wherein the liquid crystal display further has a plurality of gate lines, each gate line operating a respective plurality of said switches;

wherein each gate line is configured to operate switches connected to respective liquid crystal cells of two adjacent rows;

wherein, for each row, a first set of alternate liquid crystal cells are connected to respective switches operated by a respective one of said gate lines and a second set of interspersed alternate liquid crystal cells are connected to respective switches operated by a respective different one of said gate lines; and wherein the liquid crystal module further includes a driver circuit for driving the liquid crystal display, the driver circuit being configured to control, in turn, each gate line to operate said switches connected to the liquid crystal cells of the respective two adjacent rows and simultaneously to drive to one of two predetermined potential at least one of the strips corresponding to at least one of the respective two adjacent rows.

10. A liquid crystal module according to claim 9 wherein the driver circuit is configured to drive only said respective strip to said one of two predetermined potential at any one time.

11. A liquid crystal module according to claim 9 wherein the other strips are not driven to said one of two predetermined potentials.

12. A liquid crystal module according to claim 11 wherein the other strips are driven to a different predetermined potential.

13. A liquid crystal module according to claim 12 wherein the other strips are driven to a potential substantially midway between said two predetermined potentials.

14. A mobile telephone including a liquid crystal display module including:
- a liquid crystal display having a plurality of liquid crystal cells, a plurality of switches and a common connection for the liquid crystal cells, each liquid crystal cell being connected between a respective one of the plurality of switches and the common connection;
- wherein the common connection includes a plurality of strips, each strip extending in a first direction and the plurality of strips being arranged side by side in a second direction;
- wherein the plurality of liquid crystal cells are arranged in rows, the rows being arranged as adjacent pairs of rows, each pair of rows being arranged along and connected to a respective strip;
- wherein the liquid crystal display further has a plurality of gate lines, each gate line operating a respective plurality of said switches;
- wherein each gate line is configured to operate switches connected to respective liquid crystal cells of two adjacent rows;
- wherein, for each row, a first set of alternate liquid crystal cells are connected to respective switches operated by a respective one of said gate lines and a second set of interspersed alternate liquid crystal cells are connected to respective switches operated by a respective different one of said gate lines; and
- wherein the liquid crystal module further includes a driver circuit for driving the liquid crystal display, the driver circuit being configured to control, in turn, each gate line to operate said switches connected to the liquid crystal cells of the respective two adjacent rows and simultaneously to drive to one of two predetermined potential at least one of the strips corresponding to at least one of the respective two adjacent rows.

15. A camera including a liquid crystal display module including:
- a liquid crystal display having plurality of liquid crystal cells, a plurality of switches and a common connection for the liquid crystal cells, each liquid crystal cell being connected between a respective one of the plurality of switches and the common connection;
- wherein the common connection includes a plurality of strips, each strip extending in a first direction and the plurality of strips being arranged side by side in a second direction;
- wherein the plurality of liquid crystal cells are arranged in rows, the rows being arranged as adjacent pairs of rows, each pair of rows being arranged along and connected to a respective strip;
- wherein the liquid crystal display further has a plurality of gate lines, each gate line operating a respective plurality of said switches;
- wherein each gate line is configured to operate switches connected to respective liquid crystal cells of two adjacent rows;
- wherein, for each row, a first set of alternate liquid crystal cells are connected to respective switches operated by a respective one of said gate lines and a second set of interspersed alternate liquid crystal cells are connected to respective switches operated by a respective different one of said gate lines; and
- wherein the liquid crystal module further includes a driver circuit for driving the liquid crystal display, the driver circuit being configured to control, in turn, each gate line to operate said switches connected to the liquid crystal cells of the respective two adjacent rows and simultaneously to drive to one of two predetermined potential at least one of the strips corresponding to at least one of the respective two adjacent rows.

16. A method of driving a liquid crystal display having a plurality of liquid crystal cells, a plurality of switches and a common connection for the liquid crystal cells, each liquid crystal cell being connected between a respective one of the plurality of switches and the common connection, the method including:
- providing the common connection as a plurality of strips, each strip extending in a first direction and the plurality of strips being arranged side by side in a second direction wherein the plurality of liquid crystal cells are arranged in rows, the rows being arranged as adjacent pairs of rows, each pair of rows being arranged along and connected to a respective strip;
- providing a plurality of gate lines, each gate line operating a respective plurality of said switches wherein each gate line is configured to operate switches connected to respective liquid crystal cells of two adjacent rows;
- for each row, connecting a first set of alternate liquid crystal cells to respective switches operated by a respective one of said gate lines and connecting a second set of interspersed alternate liquid crystal cells to respective switches operated by a respective different one of said gate lines; and
- driving the liquid crystal display by controlling, in turn, each gate line to operate said switches connected to the liquid crystal cells of the respective two adjacent rows and simultaneously to drive to one of two predetermined potentials at least one of the strips corresponding to at least one of the respective two adjacent rows.

* * * * *